ELECTRONIC SCANNING SWITCH

Filed July 15, 1955 2 Sheets-Sheet 1

INVENTORS.
JOHN F. JEWETT
KENNETH L. MOOTHART
HAROLD J. MORRISON
JOHN R. SNOW
BY George Sipkin
Lee J. Huntzberger
ATTORNEYS

ELECTRONIC SCANNING SWITCH

Filed July 15, 1955 2 Sheets-Sheet 2

INVENTORS.
JOHN F. JEWETT
KENNETH L. MOOTHART
HAROLD J. MORRISON
JOHN R. SNOW
BY George Sipkin
Lee J. Huntzberger
ATTORNEYS United States Patent Office 3,015,800

Patented Jan. 2, 1962

3,015,800

ELECTRONIC SCANNING SWITCH

John F. Jewett, Saugerties, N.Y., and Kenneth L. Moothart, Mystic, Harold J. Morrison, Waterford, and John R. Snow, New London, Conn., assignors to the United States of America as represented by the Secretary of the Navy Filed July 15, 1955, Ser. No. 522,410
4 Claims. (Cl. 340—6)
(Granted under Title 35, U.S. Code (1952) sec. 266)

The invention described herein may be manufactured and used by or for the Government of the United States of America for governmental purposes without the payment of any royalties thereon or therefor.

This invention relates to an electronic scanning switch adapted to scan a plurality of discrete signal sources to derive a continuous interpolated output signal.

Briefly, this invention contemplates applying the signal from each one of the sources as a first input, and a respective one of a number of switching waves as a second input, to a separate one of a number of amplifiers, each of which produces an output current having an instantaneous magnitude substantially proportional to the product of the instantaneous magnitudes of first and second inputs applied thereto over the operating range of the amplifier. The output currents of all the amplifiers are connected in parallel through a single output load.

The heart of the invention lies in the relationship between the waveform of the switching waves and the relative time of application of the respective switching waves to the various amplifiers. The amplitudes and polarity of the switching waves are such as to normally cut off the amplifiers to which they are applied. However, each switching wave includes a triangular pulse during which the amplifier to which it is applied is conductive. The triangular pulse has a slope of substantially fixed magnitude for a given time interval and then a slope of the same substantially fixed magnitude, but of opposite sign, for an additional given time interval. The switching waves are timed relative to each other so that successive triangular pulses are spaced in time by this given time interval. This results in a scan of a discrete number of signal sources wherein a continuous interpolated output is derived across the load of the amplifiers. This invention is particularly suited for the scanning of signal sources such as sonar receiver transducers.

In addition, this invention contemplates periodically initiating separate scanning cycles at a rate which is independent of the duration of each scanning cycle.

It is therefore an object of this invention to provide an electronic switch for scanning a discrete number of signal sources to provide a continuous interpolated output signal during each scanning cycle.

It is a further object of this invention to provide an electronic scanning switch wherein separate scanning cycles are periodically initiated at a rate which is independent of the duration of a scanning cycle.

It is a furher object of this invention to provide a novel triangle generator.

It is a further object of this invention to provide a novel rectangular pulse generator.

Other objects and many of the attendant advantages of this invention will be readily appreciated as the same becomes better understood by reference to the following detailed description when considered in connection with the accompanying drawings wherein.

Figure 1:
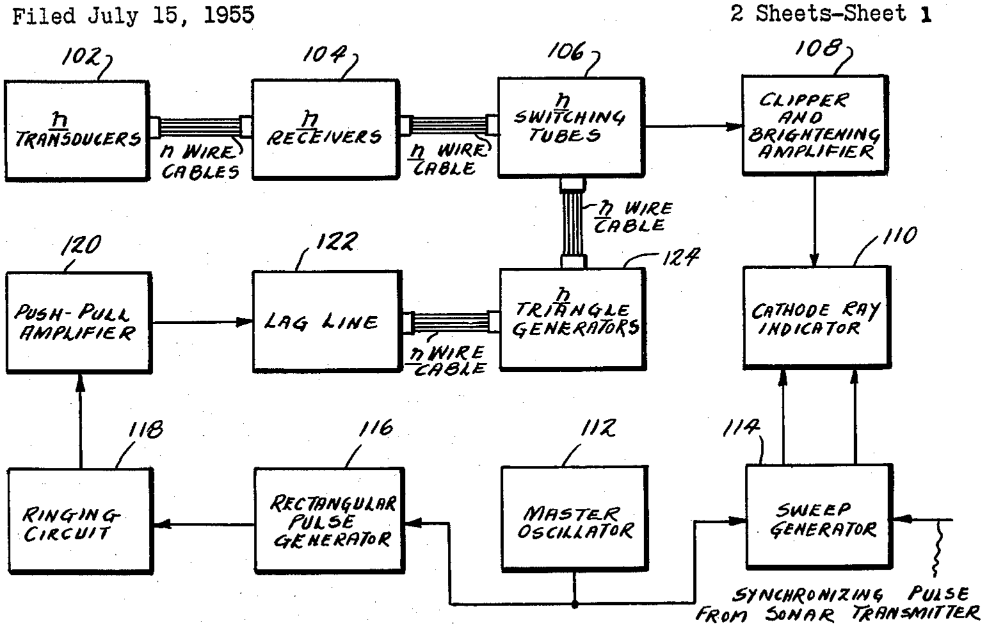
FIG. 1 is a block diagram of a preferred embodiment of this invention.

Referring to FIG. 1, there is shown a sonar receiving system. $n$ transducers, denoted by block 102, each of which is directional and has a given lobe or beam width are arcuately spaced on the circumference of a sector of a circle. The spacing is such that there is substantially a fifty percent overlap between the beams of adjacent transducers. In the system which was actually constructed there were 25 transducers, each of which had a beam width of approximately 7 degrees. The 25 transducers were distributed over an arc of 72 degrees in the depth plane or azimuth plane with an angular spacing between adjacent beams of 3 degrees.

Figure 4:
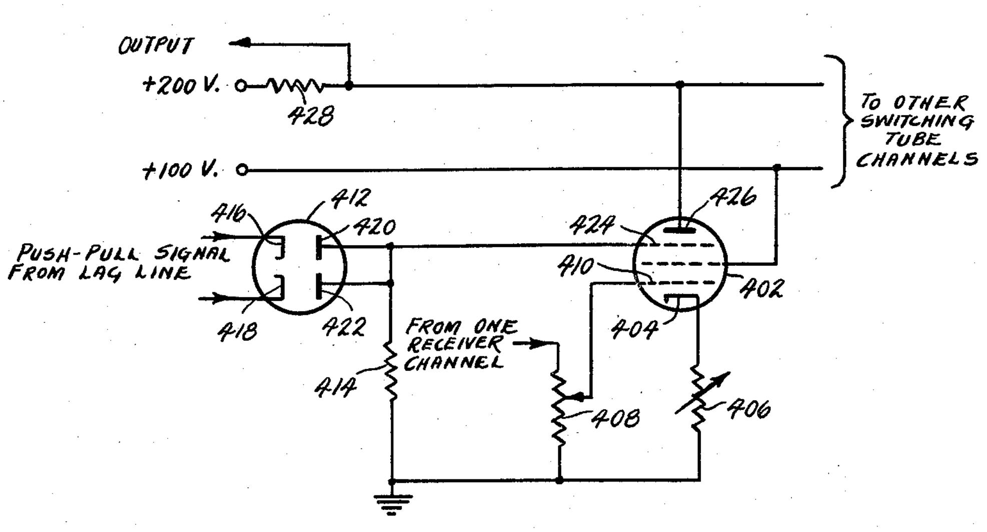
FIG. 4 is a schematic diagram of one of the triangle generators and one of the switching tubes shown in FIG. 1.

Each one of $n$ transducers 102 is connected to a separate one of $n$ receivers 104 through an $n$ wire cable. The output of each one of $n$ receivers 104 is connected as a first input to a separate one of $n$ switching tubes 106. A schematic circuit diagram for a representative one of $n$ switching tubes 106 is shown in FIG. 4, discussed below. The output of $n$ switching tubes 106 is applied through clipper and brightening amplifier 108 to cathode ray indicator 110, where it controls the intensity modulation of the cathode ray thereof.

Oscillations from master oscillator 112 are applied through sweep generator 114 to cathode ray indicator 110 for sweeping the cathode ray thereof. The output from sweep generator 114 consists of two sinusoidal waves in phase quadrature each having a frequency equal to that of master oscillator 112 and an amplitude proportional to the elapsed time from the application of a synchronizing pulse from the sonar transmitter. This causes a spiral sweep to be produced on cathode ray indicator 110, the cathode ray thereof rotating through 360 degrees during each cycle of master oscillator 112. In the system which was actually constructed the frequency of master oscillator 112 was 1,000 cycles per second.

The output from master oscillator 112 is also applied as an input to rectangular pulse generator 116, which is shown in detail in FIG. 2, discussed below. Rectangular pulse generator 116 produces a rectangular pulse for each cycle of master oscillator 112, this pulse having a width equal to a portion of a period of an oscillation from master oscillator 112. The rectangular pulse output of rectangular pulse generator 116 is applied to ringing circuit 118. Ringing circuit 118, which is shown in detail in FIG. 3, discussed below, produces oscillations at a higher frequency than that of the oscillations produced by the master oscillator 112. The oscillations produced by ringing circuit 118 are initiated in responsie to the leading edge of the rectangular pulse applied thereto from rectangular pulse generator 116 and are terminated in response to the lagging edge of the rectangular pulse applied thereto from rectangular pulse generator 116. In the system actually constructed the oscillations produced by ringing circuit 118 were at a frequency of 2500 cycles per second.

The oscillations from ringing circuit 118 are applied through push-pull amplifier 120 as an input to lag line 122. Lag line 122 is a conventional artificial delay line having $n$ taps along the length thereof. These taps are equally spaced from each other to provide a time delay between the outputs obtained from successive taps approximately equal to the time required for the cathode ray of cathode ray indicator 110 to sweep through an angle equal to the angular spacing between adjacent transducers of $n$ transducers 102. Since in the system actually constructed the spacing between adjacent transducers was 3 degrees and the frequency of the sweep of cathode ray indicator 110 was 1000 cycles per second, the time required for the sweep of cathode ray indicator 110 to sweep three degrees was 8⅓ microseconds.

Each tap of lag line 122 is connected to a separate one of *n* triangle generators 124. A respective one of *n* triangle generators 124 together with a respective one of *n* switching tubes 106 is shown in detail in FIG. 4, discussed below. The output from each of *n* triangle generators 124 is applied as a second input to a separate one of *n* switching tubes 106. The waveform of the output from each of *n* triangle generators 124 includes isosceles triangular pulses and is such that the switching tube to which it is applied is maintained cut off except for the duration of these triangular pulses.

A triangular pulse is generated each half cycle of the output of lag line 122 applied to that respective triangle generator. Therefore, respective triangular pulses generated in response to respective outputs of said lag lines obtained from successive taps will be delayed by the same amount as the delay between these outputs, i.e., 8⅓ microseconds in the case of the system actually constructed. The duration of each triangular pulse is made equal to approximately twice this delay. Furthermore, the instantaneous output of each one of *n* switching tubes 106 is proportional to the product of the instantaneous magitudes of its first and second inputs. Thus, when one switching tube has its maximum conduction, i.e., the triangular pulse applied thereto is at its maximum, the preceding switching tube will just be ending its conduction and the following switching tube will just be beginning its conduction.

Figure 2:
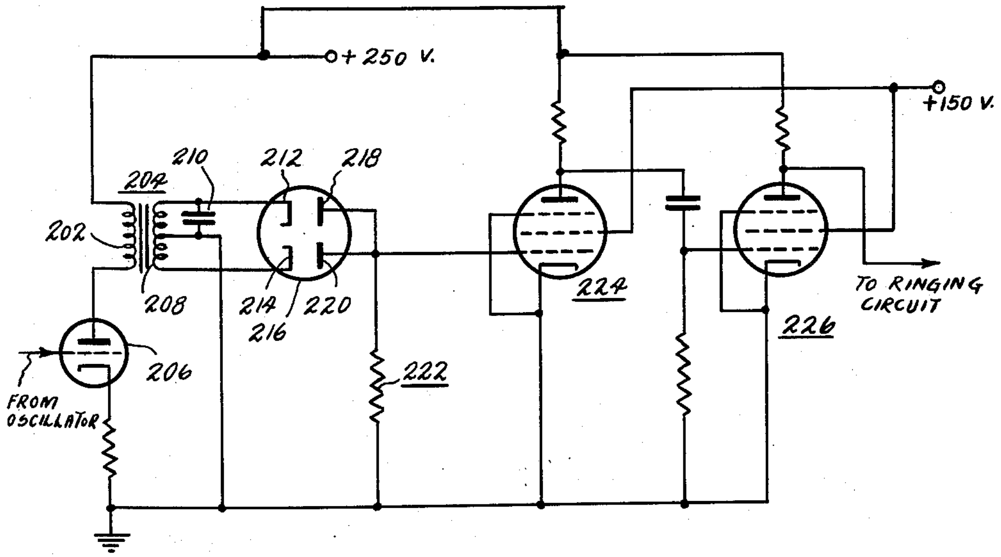
FIG. 2 is a schematic circuit diagram of the rectangular pulse generator shown in FIG. 1.

Referring now to FIG. 2, there is shown a schematic circuit diagram of rectangular pulse generator 116. Primary winding 202 of transformer 204 is in circuit with the output of amplifier 206 to which oscillations from oscillator 112 are applied as an input. Secondary winding 208 of transformer 204 has a center tap which is connected to ground. The top half of secondary winding 208 is shunted by capacitor 210. One end of secondary winding 208 is connected to cathode 212 and the other end of secondary winding 208 is connected to cathode 214 of dual diode 216. Anodes 218 and 220 of dual diode 216 are connected in parallel through load resistance 222. The output across load resistance 222 is applied as an input to overdriven amplifier 224. The output of overdriven amplifier 224 is applied as an input to overdriven amplifier 226. The rectangular pulse is obtained as the outpu of overdriven amplifier 226 and is applied to ringing circuit 118.

Amplifier 206 merely amplifies the oscillations from oscillator 112 in a convention manner, thereby producing an oscillating voltage across primary winding 202 of transformer 204. This oscillating voltage induces an oscillating voltage in secondary winding 208 of transformer 204. Due to the fact that capacitance 210 shunts the top half of secondary winding 208, the voltage developed between the top end of secondary winding 208 and the center tap thereof differs in phase with respect to the voltage developed between the bottom end of secondary winding 208 and the center tap thereof by an amount which is other than zero and 180 degrees.

The voltage developed by the top half of secondary winding 208 is rectified by the diode consisting of cathode 212 and anode 218 and then applied to load resistance 222. The voltage developed by the bottom half of secondary winding 208 is rectified by the diode consisting of cathode 214 and anode 220 and then is also applied to load resistance 222. For each time interval equal to a period of the oscillations there will be a first portion during which at least one of the two diodes conducts and a second portion during which neither diode conducts. The relative length of these two portions is determined by the phase difference between the voltage developed in the top half of secondary winding 208 and the voltage developed in the bottom half of secondary winding 208, which is a function of the size of capacitor 210. With the diodes connected, as shown, there will be a negative voltage developed across both resistance 222 during the first portion when at least one of the diodes conducts and there will be no voltage developed across load resistance 222 during the second portion, when neither diode conducts.

The negative voltage developed across load resistance 222 has an amplitude sufficient to cut off overdriven amplifier 224. Therefore, overdriven amplifier 224 will only conduct for the second portion when neither diode conducts. Overdriven amplifier 224 will thus develop as an output a positive pulse which has a duration equal to the first portion during which at least one of the diodes is conducting, i.e., for the length of time that a negative voltage is applied as an input to overdriven amplifier 224 from load resistance 222. The positive output pulse developed by overdriven amplifier 224 is capacitively coupled to the input of overdriven amplifier 226. This positive pulse has an amplitude sufficient to drive overdriven amplifier 226 beyond saturation. There will therefore be developed in the output of overdriven amplifier 226 a rectangular pulse having a duration equal to the first portion during which at least one of the diodes is conducting.

Figure 3:
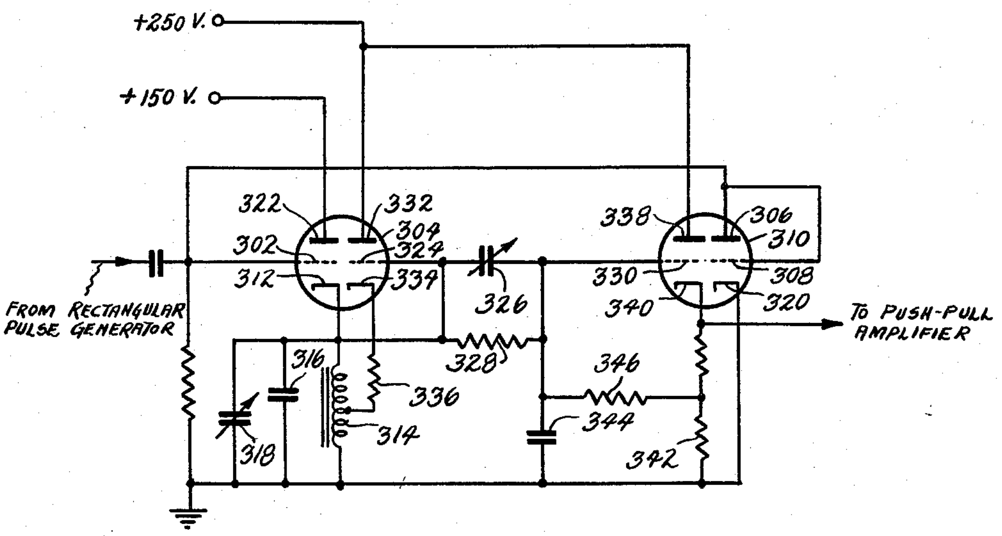
FIG. 3 is a schematic circuit diagram of the ringing circuit shown in FIG. 1.

Referring now to FIG. 3, there is shown a schematic diagram of ringing circuit 118. The rectangular pulse from rectangular pulse generator 116 is capacitively coupled to control electrode 302 of electron tube 304, and also to anode 306 and control electrode 308 of electron tube 310. Cathode 312 of electron tube 304 is connected to ground through a resonant circuit consisting of inductance 314 and capacitors 316 and 318. Capacitor 318 is merely a trimmer for varying the resonant frequency of the resonant circuit. Cathode 320 of electron tube 310 is connected directly to ground. Anode 322 of electron tube 304 is connected to a source of low positive potential. Cathode 312 of electron tube 304 is connected directly to control electrode 324 of electron tube 304 and through capacitor 326 and resistor 328 in parallel to control electrode 330 of electron tube 310. Anode 332 of electron tube 304 is connected directly to a point of high positive potential. Cathode 334 of electron tube 304 is connected to a tap of inductance 314 through resistance 336. Anode 338 of electron tube 310 is connected directly to a point of high positive potential and cathode 340 of electron tube 310 is connected to ground through resistor 342. Control electrode 330 of electron tube 310 is connected to ground through capacitor 344 and to a tap on resistor 342 through resistor 346. The output to push-pull amplifier 120 is obtained across resistor 342.

In the absence of an input all the tubes conduct. Control electrode 302 of electron tube 304 is shorted to ground through control electrode 308 and anode 306, which are tied together, and cathode 320 of electron tube 310. A relatively high current, therefore, flows between anode 322 and cathode 312 of electron tube 304. This current builds up a magnetic field surrounding inductance 314.

The application of a negative pulse to control electrode 302 of electron tube 304 from rectangular pulse generator 116 causes cutoff of current between anode 306 and cathode 320 of electron tube 310 and anode 322 and cathode 312 of electron tube 304. This causes the magnetic field surrounding inductance 314 to collapse, thereby shock exciting the resonant circuit composed of inductance 314 and capacitances 316 and 318 into oscillations. These oscillations are applied directly to control electrode 324 of electron tube 304, which reproduces the oscillations in the cathode current of cathode 334 of electron tube 304. This current passes through a portion of inductance 314, whereby transformer action the oscillations are sustained at cathode 312 of electron tube 304. The oscillations are also applied to control electrode 330 through capacitor 326 and resistor 328 which act as part of a voltage divider with capacitor 344. Capacitor 326 is made variable to control the phase and amplitude of the oscillations applied to control electrode 330 of electron tube 310. Output oscillations are obtained across resistance 342. Resistance 346 applies a negative voltage feedback to control electrode 330 of electron tube 310. At the termination of the negative pulse from rectangular pulse generator 116 conduction between anode 306 and cathode 320 of electron tube 310, and anode 322 and cathode 312 of electron tube 304 resumes. The conductance between anode 322 and cathode 312 of electron tube 304 acts as a very low impedance shunting inductance 314, thereby suppressing the oscillations in the resonant circuit composed of inductance 314 in capacitances 316 and 318. The magnetic field surrounding inductance 314 is now built up again in preparation for the next rectangular pulse from rectangular pulse generator 116.

Referring now to FIG. 4, there is shown a schematic diagram of a respective one of the triangle generators and switching tubes. Each switching tube consists of a pentode, such as electron tube 402. Cathode 404 of electron tube 402 is connected to ground through variable resistance 406. A signal from a respective one of the receiver channels is connected to potentiometer 408. The movable tap of potentiometer 408 is connected to control electrode 410 of electron tube 402.

The triangle generator consists of twin diode 412 and resistance 414. The push-pull signal from a tap on lag line 122 is applied to cathodes 416 and 418 of twin diode 412. Anodes 420 and 422 of twin diode 412 are connected in parallel to ground through resistance 414. The signal across resistance 414 is applied to suppressor electrode 424 of electron tube 402. Anode 426 of electron tube 402 is connected to a point of positive potential, in parallel with the anodes of all the other switching tubes, through a single load resistance 428.

It will be seen that the triangle generator is merely a full wave rectifier so connected as to provide a negative signal from a sinusoidal input. Since the push-pull signal from line 122 is a sinusoidal input, a negative fully rectified sinusoidal wave is developed across resistance 414. This fully rectified sinusoidal wave, which is connected to suppressor electrode 424 of electron tube 402, has an amplitude sufficient to cut off electron tube 402 except in the vicinity of the cusps of the fully rectified wave. This is readily accomplished by clamping the peaks of the triangle generator output to that bias potential which causes electron tube 402 to be cut off at the selected point. The exact duration during which electronic tube 402 is conductive is controlled by varying resistance 406. Potentiometer 48 serves to equalize the signals applied to the control electrodes of the several switching tubes.

The output obtained across resistance 428 from electron tube 402 is proportional to the current flowing in electron tube 402. The current flowing in electron tube 402 is proportional to the instantaneous magnitudes of the voltages applied to control electrode 410 and suppressor electrode 424 during the interval the voltage applied to suppressor electrode 424 is sufficient to render electron tube 402 conductive.

Referring now to the operation of the complete system shown in FIG. 1, signals reflected from sonar targets impinge upon particular ones of $n$ transducers 102. If a signal from a selected one of these sonar targets is directly in line with one of the transducers, it impinges only on this transducer. However, if it is not directly in line with one of the transducers, portions of the signal therefrom impinge on two adjacent transducers. The output of $n$ transducers 102, after being detected by $n$ receivers 104, are applied to the respective control electrodes of $n$ switching tubes 106.

The output of master oscillator 112, which is applied to cathode ray indicator 110 through sweep generator 114, causes the cathode ray thereof to rotate at the frequency of master oscillator 112. Since the oscillations of ringing circuit 118 are initiated by the leading edge of rectangular pulses from tectangular pulse generator 116, which, in turn, occur once each cycle of master oscillator 112, the output of ringing circuit 118, and the $n$ triangle pulses derived therefrom, are phase-locked with respect to the oscillations from master oscillator 112.

The time delay between successive taps on lag line 122, which determines the time interval between successive triangular pulses, is made equal to the time required for the cathode ray of cathode ray indicator 110 to rotate through an angle equal to the angular spacing between adjacent transducers of $n$ transducers 102. Since the instantaneous output from any one of $n$ switching tubes 106 depends upon the instantaneous magnitudes of the voltages applied to its control electrode and suppressor electrode, the interpolated output from $n$ switching tubes 106, which is applied to intensity modulate the cathode ray of cathode ray indicator 110 through clipper and brightening amplifier 108, produces a visual indication of each sonar target on the face of cathode ray indicator 110. From the relationship which exists among the spacing of $n$ transducers 102, the time interval between successive triangular pulses and the frequency of master oscillator 112, all of which are discussed above, it will be seen that the angular position on the face of cathode ray indicator 110 of an indication of any selected target will be exactly equal to the true bearing of that selected target.

Since the output of ringing circuit 118 includes a plurality of half-cycles of oscillation, producing more than one series of triangular pulses for each cycle of master oscillator 112, the output of $n$ switching tubes 106 will include extraneous scans of $n$ transducers 102. These extraneous scans will appear on the face of cathode ray indicator 110 in sectors other than the desired sector. The effect of these extraneous scans can be eliminated by placing a mask over the face of cathode ray indicator 110 which has a sector cut out therefrom equal in angle to the sector covered by $n$ transducers 102.

Obviously many modifications and variations of the present invention are possible in the light of the above teachings. It is therefore to be understood that within the scope of the appended claims the invention may be practiced otherwise than as specifically described.

We claim:

1. An electronic switch adapted to scan a given plurality of signal sources, said switch comprising; a plurality of amplifiers equal in number to said given plurality, each of said amplifiers producing an output current having an instantaneous magnitude substantially proportional to the product of the instantaneous magnitudes of first and second separate input voltages applied thereto over the operating range of each of said amplifiers; a single output load; means coupling said load to said amplifiers for applying the output currents of said amplifiers in parallel through said load; means coupling said signal sources to said amplifiers for applying each one of the signals from said signal sources as said first input to a separate one of said amplifiers; second input voltage means coupled to said amplifiers for normally applying as said second input to said amplifiers a voltage sufficient to render said amplifiers cut-off, said second input voltage means including switching voltage generating means responsive to the time of occurrence of a scan initiating input applied thereto for generating a sequence of separate time-spaced triangular pulses equal in number to said given plurality, each pulse following the first of said sequence being initiated a given predetermined time interval after the initiation of the next preceding pulse of said sequence and each pulse of said sequence having first a slope of a substantially fixed magnitude for a duration equal to said given time interval and then a slope of said substantially fixed magnitude but of opposite sign for a duration equal to said given time interval, and means coupled to said voltage generating means for applying a separate one of said triangular pulses as said second input to each one of said amplifiers for operating each of said amplifiers only during the presence of the triangular pulse applied thereto, whereby a continuous interpolated output signal is obtained across said load during a scan of said signal sources; said second input voltage means including a multitapped lag line having a plurality of taps equal in number to said given plurality, said taps being equally spaced from each other along the length thereof, said lag line being responsive to a sinusoidal wave having a period which is long relative to said predetermined time interval applied as an input thereto, the spacing between taps being such that the time required for said wave to travel the distance between any two adjacent taps is equal to said given predetermined time interval, a plurality of full wave rectifier means equal in number to said given plurality each of which is coupled between a respective one of the taps of said lag line and a respective one of said amplifiers for fully rectifying the sinusoidal wave output appearing at said respective one of said taps, and means for applying the fully-rectified sinuosoidal wave output with sufficient amplitude and the proper polarity as said second input to said respective one of said amplifiers as to allow operation of said respective one of said amplifiers only in the vicinity of the cusp of said fully-rectified sinusoidal wave for a duration equal to twice said predetermined time interval; sinusoidal wave generating means for generating discontinuous waves of sinusoidal form at fixed time intervals which are independent of the period of said waves; means for applying said waves as the input to said lag line; said sinusoidal wave generating means including oscillator means for generating oscillations at a first given frequency, rectangular pulse generating means coupled to said oscillator means for generating a rectangular pulse having a width equal to a fixed portion of the period of an oscillation in fixed time relationship with respect to each cycle of said oscillations, a gated ringing circuit including a tuned circuit resonant at a second given frequency which is higher than said first given frequency, and means for applying said rectangular pulse to said ringing circuit to initiate the generation of said sinusoidal wave at said second given frequency in response to the leading edge of said rectangular pulse and to cease the generation of said sinusoidal wave in response to the lagging edge of said rectangular pulse, the width of said rectangular pulse being at least equal to a period of said sinusoidal wave.

2. The electronic switch defined in claim 1, further including a cathode ray indicator, sweep means coupling said oscillator means to said cathode ray indicator for rotating the cathode ray thereof isochronously with said oscillations from said oscillator means, and means coupling said output load to said cathode ray indicator for intensity-modulating the cathode ray thereof with the output signal across said load.

3. The electronic switch defined in claim 2, wherein each of said given plurality of signal sources comprise a directional transducer means having a given beam width, said given plurality of transducer means lying in equally-spaced relationship with respect to each other on the circumference of a sector of given arcuate extent of a circle and being so disposed relative to each other that the beams of adjacent transducers have approximately fifty percent overlap, and wherein said given time interval is equal to the time required by the cathode ray of said indicator to rotate through an angle equal to the spacing of adjacent transducers.

4. An electronic scanning switch for periodically scanning a given plurality of signal sources, said switch comprising; a plurality of switching amplifiers equal in number to said given plurality, all of said switching amplifiers having an output load in common, each of said switching amplifiers producing an output current that flows through said common output load and having an instantaneous magnitude substantially proportional to the product of the instantaneous magnitudes of first and second separate input voltages applied thereto over the operating range of each of said switching amplifiers; means for coupling said switching amplifiers to said signal sources for applying signals from the signal sources as said first input to respective ones of said switching amplifiers; second input voltage means coupled to said switching amplifiers for normally applying as said second input to said switching amplifiers a voltage sufficient to render said amplifiers cut-off and for generating during each scanning cycle a sequence of spaced substantially isosceles triangle pulses equal in number to said given plurality, said second input voltage means including an oscillator whose period of oscillation is equal to and determines the scan period, rectangular pulse generating means coupled to said oscillator and generating a rectangular pulse synchronously with each cycle of said oscillator, said rectangular pulses having a width equal to a fixed portion of the period of said oscillator, a gated ringing circuit including a tuned circuit resonant at a frequency higher than oscillator frequency, means applying said rectangular pulses to said ringing circuit whereby said ringing circuit commences generation of a sinusoidal wave in response to the leading edge of each rectangular pulse and ceases sinusoidal wave generation in response to the trailing edge of each rectangular pulse, the period of said sinusoidal wave being no greater than the rectangular pulse width, a multitapped lag line having a plurality of taps equal in number to said given plurality, the total time delay provided by said lag line being less than the period of said oscillator, and being such that during each oscillator cycle a sinusoidal wave from said ringing circuit completely traverses said lag line, a plurality of full wave rectifiers equal in number to said given plurality coupled between the taps of said lag line and respective ones of said switching amplifiers and fully rectifying sinusoidal wave outputs appearing at the respective taps, and means applying the fully rectified sinusoidal wave outputs at the proper polarity and at sufficient amplitude and bias, as said second input to the respective amplifiers as to allow operation thereof only in the vicinity of the cusps of the fully-rectified sinusoidal waves.

References Cited in the file of this patent

UNITED STATES PATENTS

| | | |
|---|---|---|
| 2,195,855 | Fitch | Apr. 2, 1940 |
| 2,486,789 | Lakatos | Nov. 1, 1949 |
| 2,680,151 | Boothroyd | June 1, 1954 |